Feb. 6, 1973  A. R. JUBENVILLE  3,715,003
TRAILER ANTIFISHTAIL CONTROL SYSTEM
Filed Oct. 15, 1970  5 Sheets-Sheet 1

INVENTOR
ARTHUR R. JUBENVILLE
BY Edgar H. Jay
ATTORNEY

Feb. 6, 1973    A. R. JUBENVILLE    3,715,003
TRAILER ANTIFISHTAIL CONTROL SYSTEM
Filed Oct. 15, 1970    5 Sheets-Sheet 2

INVENTOR
ARTHUR R. JUBENVILLE
BY *Edgar H. Jay*
ATTORNEY

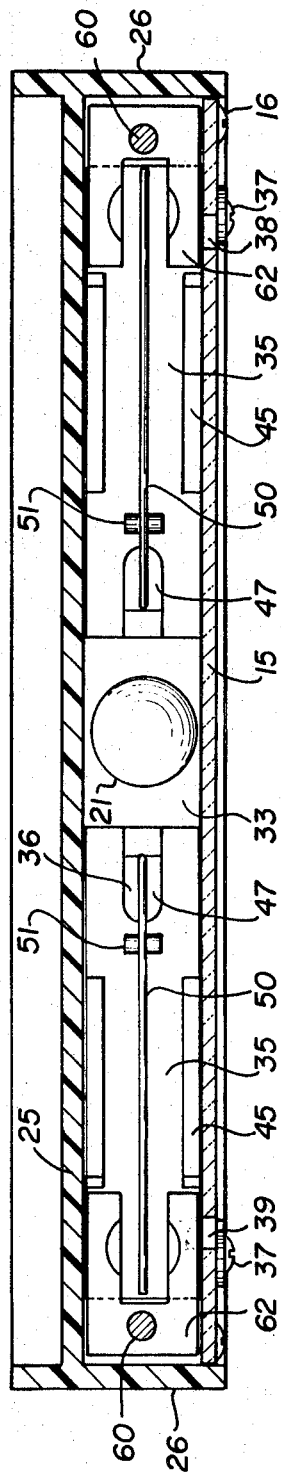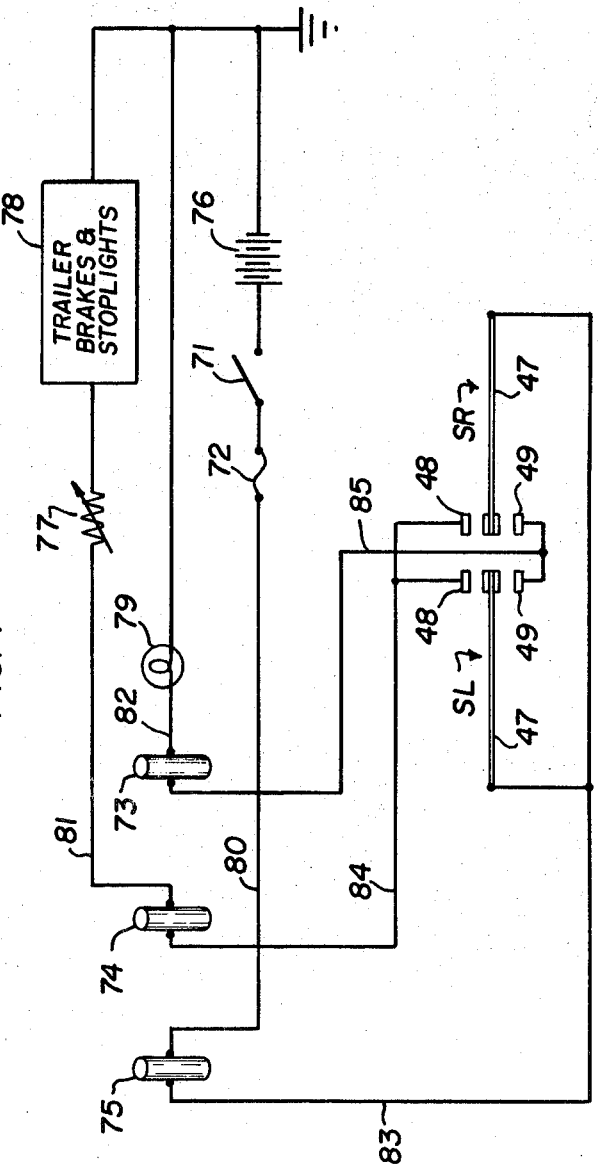

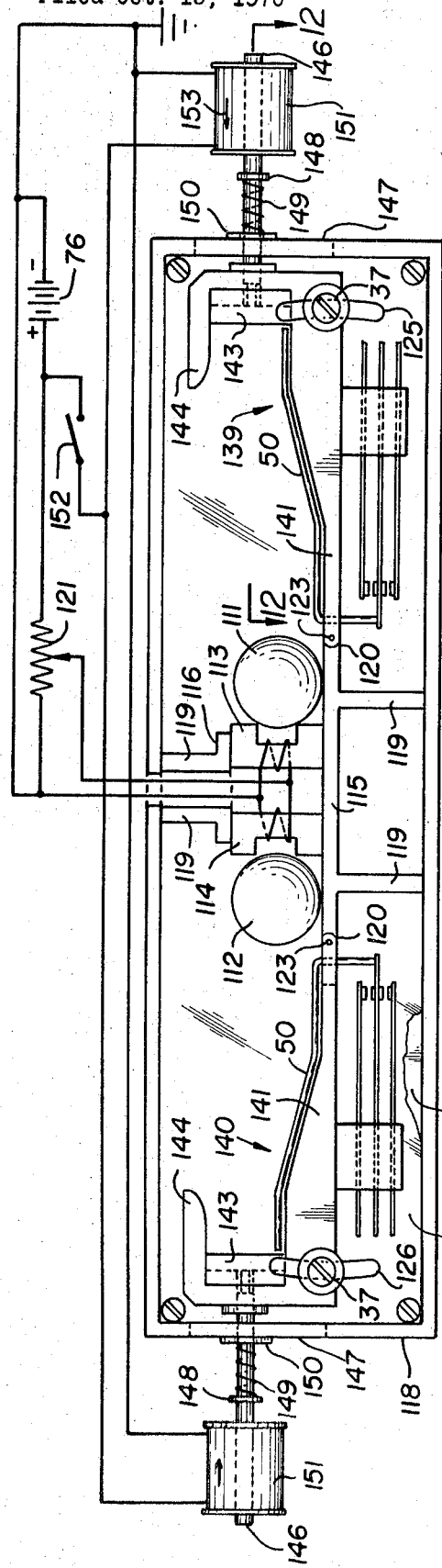
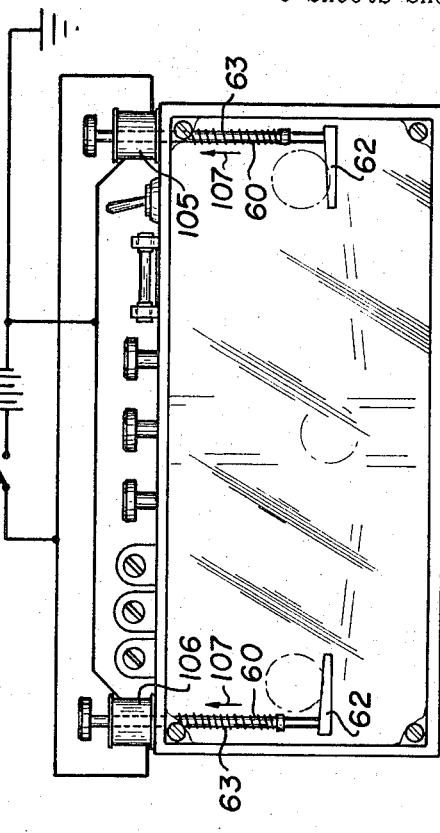
FIG.10
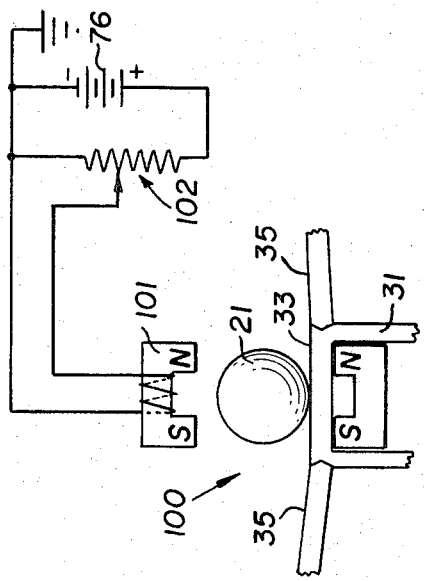
FIG.9
INVENTOR
ARTHUR R. JUBENVILLE
BY
ATTORNEY

United States Patent Office 3,715,003
Patented Feb. 6, 1973

3,715,003
TRAILER ANTIFISHTAIL CONTROL SYSTEM
Arthur R. Jubenville, 20 Grist Mill Lane,
Halesite, N.Y. 11743
Filed Oct. 15, 1970, Ser. No. 80,834
Int. Cl. B60t 7/20
U.S. Cl. 180—103          34 Claims

ABSTRACT OF THE DISCLOSURE

A towed vehicle antifishtail control system in which a ferromagnetic ball functions as an acceleration sensing body and is movable in response to lateral acceleration of the towed vehicle, from a central rest position to either side relative to the inclined branches of a path provided by ramp assemblies which preferably are movably mounted. Magnetic apparatus is provided for adjustably biasing the ball to hold it in its rest position. Movement of the ball along either path branch results first in actuation of a warning device and then actuation of the towed vehicle's brakes. Apparatus is also disclosed for releasably trapping the ball at either extremity of its path.

---

The present invention relates to a trailer control system and, more particularly, to a system for automatically damping and eliminating lateral oscillation such as fishtailing or other unwanted lateral acceleration of a towed vehicle.

At the present time, a rapidly increasing number of trailers, both recreational and commercial, of widely varying sizes and purposes is being put into use. All such vehicles, when subjected to a lateral force, tend to oscillate or fishtail and, with increasing size of the trailer and/or the speed at which it is being towed, the more immediately must the proper corrective action be taken. This imposes a great strain even on the most competent operators and all to frequently results in serious accidents.

In controlling the combination made up of the towing vehicle and the towed vehicle at the start of fishtailing, the operator must not try to steer out of the situation, but instead must apply the brakes, and the brakes of the trailer must be applied in such a way that a substantially greater braking force is applied directly to the trailer than to the towing vehicle. In the conventional arrangement, the trailer and its electrically operated brakes are connected to the towing car and its hydraulic brake system so that the increase of pressure in the hydraulic system upon application of the auto's brakes serves to actuate the electrical brake system of the trailer. Normallly, the arrangement of the auto brakes and the trailer brakes is such that the trailer brakes are applied before the car brakes. Theoretically, nothing more should be required. However, in practice that is often not the case. Even when the brakes are properly adjusted and applied, the very condition sought to be corrected can prevent the actuation of the towing vehicle's brake system from having the normal and intended effect. This is because the fishtailing of the trailer can cause what may be termed lateral weight shift of the trailer on its wheels, and the resulting unequal loading causes inadequate braking on at least one side. When this occurs, the net result is an aggravation of the situation which often leads to complete loss of control by the operator.

It has been recognized that the onset of lateral oscillations by the towed vehicle can be best dealt with by applying only the trailer brakes, and for this purpose an independent, manually operated device, usually a control lever, is provided so that the operator can actuate the trailer brakes independently of and without actuating the brakes of the towing vehicle. Because of the difficulty of early detection of lateral oscillations and of applying the required correction, there have hitherto been provided various systems for aiding the operator of such vehicles, but they have left much to be desired even when, as in U.S. Pat. No. 3,398,991 granted on Aug. 27, 1968, the centrifugal forces generated by the lateral swaying of a vehicular trailer through the effect thereof on a liquid in a reservoir is relied on to cause actuation of the brakes.

It is therefore a principal object of this invention to provide an improved vehicular trailer control system which in response to the onset of lateral oscillation of the trailer automatically actuates the trailer brakes.

A more specific object of this invention is to provide such a trailer control system, the sensitivity of which can be readily adjusted to take into account the difference in magnitude of the effect of a given external force upon towed vehicles of different length, size and weight.

Another object of this invention is to provide such a trailer control system in which adjustment can be made in the length of the period the trailer brakes remain actuated in response to an external force of a given magnitude so as to compensate, for example, for variations in the gross weight of the trailer such as may occur when the tralier is not fully loaded, but is empty or only partially loaded.

Yet another object is to provide such an automatic trailer control system which is compact, can be readily installed in the vehicles and, in particular, requires very little space in the trailer; yet is characterized in operation by a long, trouble-free, useful life.

A further object is to provide such a trailer control system which is of relatively simple construction, but can be readily adjusted and controlled in use.

Further objects as well as advantages of this invention will be apparent from the following detailed description thereof and the accompanying drawings in which FIG. 1 is a diagrammatic view of a towed vehicle and a towing vehicle shown illustratively as a travel trailer hitched to the rear of a passenger automobile and incorporating a control system in accordance with the present invention;

FIG. 2 is a front elevational view of the control unit with its transparent cover in place mounted on the interior of the rear wall of the trailer shown in FIG. 1;

FIGS. 3, 4 and 5 are cross-sectional views taken along the lines 3—3, 4—4 and 5—5 respectively of FIG. 2;

FIG. 8 is a schematic view showing the electrical circuit of the control unit;

FIG. 9 is an elevational view partially diagrammatic and broken away for convenience showing a modification of the control unit utilizing a variable electromagnetic biasing means;

FIG. 10 is a fragmentary cross-sectional view of a modified reset means actuated by a solenoid;

FIG. 11 is a front elevational view showing a further modification in which two balls are used and are biased by variable electromagnetic means and in which magnetic gate means are used in conjunction with electromagnetic reset means;

Figure 1:
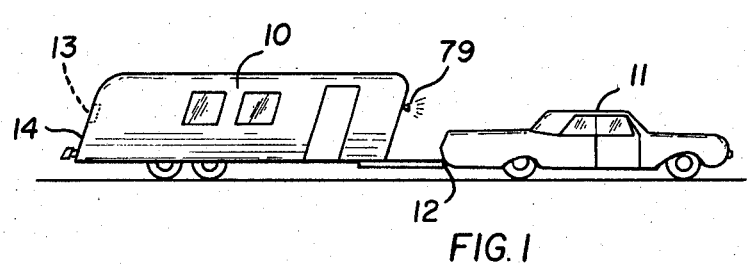

Referring to FIGS. 1–8, a preferred embodiment of the invention will now be described as installed in a towed vehicle shown illustratively as a travel trailer 10 towed by means of a conventional ball-type hitch 12, behind a towing vehicle shown illustratively as a passenger car 11. The casing 13 of the control unit is mounted in any convenient position to extend from side to side in the trailer not necessarily on the front-to-back center line of the trailer. Preferably the casing 13 is mounted to the rear of the trailer wheels and may be mounted on the inwardly facing surface of the rear wall 14 of the trailer 10 as indicated in FIG. 1. If desired, the entire control system of this invention can be mounted on or in the trailer 10, but preferably at least a warning device such as a lamp and an on/off switch are mounted in the towing vehicle 11 convenient to the operator.

Trailer 10 and car 11 can be of any well-known construction as may be desired. Hitch 12 by which the trailer 10 and car 11 are operatively connected is also of known construction. Since the construction of trailer 10, car 11 and hitch 12 form no part of the present invention, they need not be described in detail here. Suffice it to say here that trailer 10 is equipped with electrically operated brakes which preferably can be operated by the driver of car 11 by means of a manually operated lever independently of the car's braking system and by means of the foot pedal by which the car's brakes are actuated.

Figure 2:
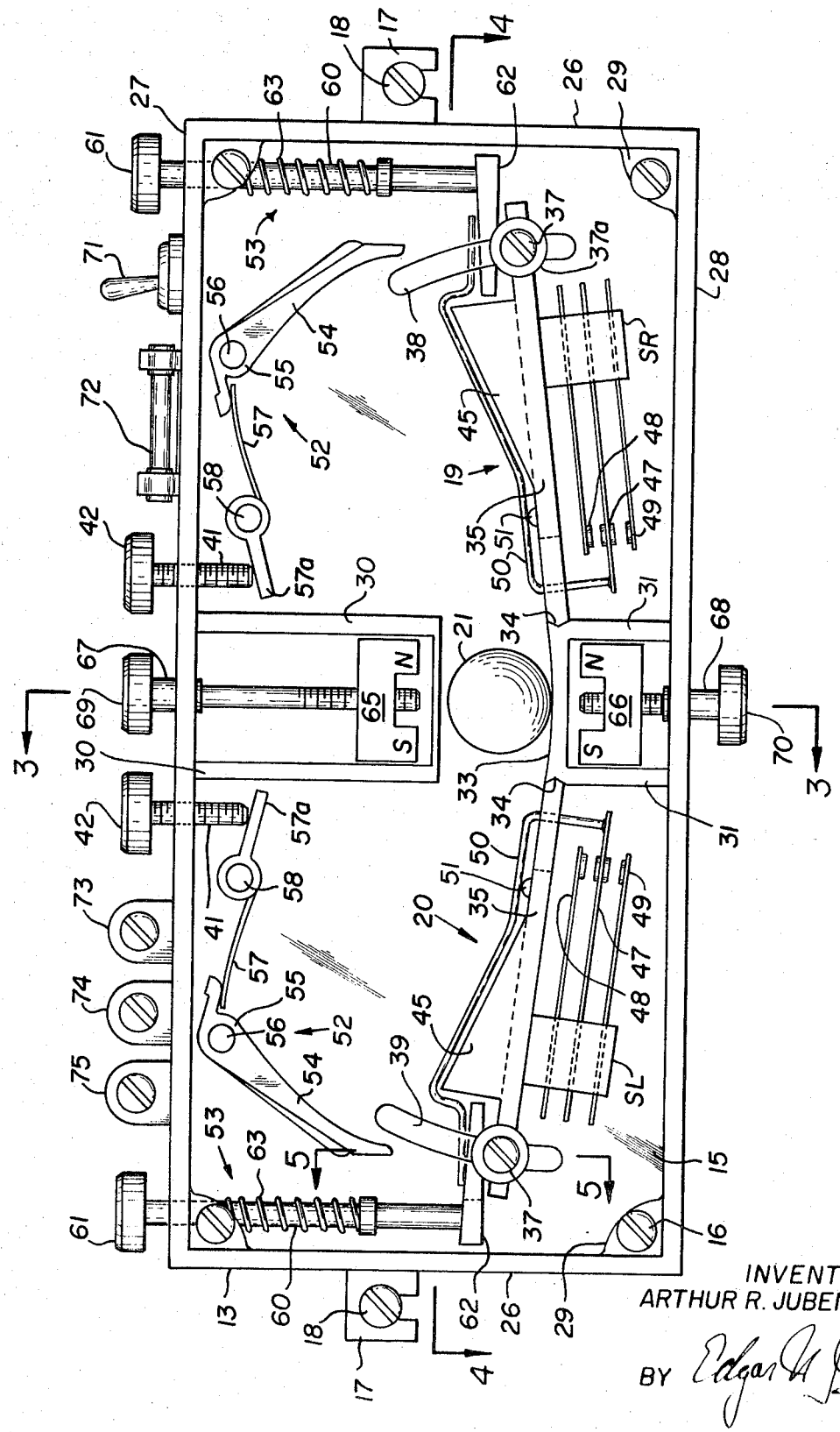

Casing 13 has a cover 15 which preferably is transparent as shown and which is held closed by screws 16 (FIG. 2). The casing 13 is provided with ears 17 by which it is conveniently connected by screws 18 to the trailer wall 14.

Figures 3, 5:
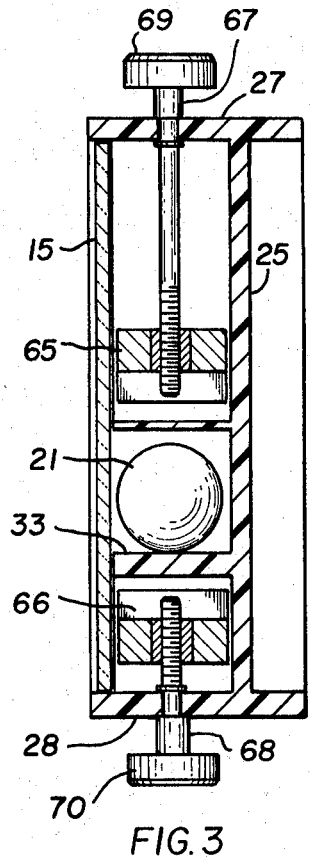

As most clearly seen in FIGS. 2-4, the control system comprises right and left ramp assemblies 19 and 20 respectively which are pivotally mounted in casing 13 and are adjustable, about pivot points located at their inner ends, to form a larger or smaller angle to the horizontal as will be more fully pointed out hereinafter. An acceleration sensing body which can be a ball 21, at least initially because of its inertia, is accelerated relative to trailer 10 because of lateral motion of the rear end of the trailer, and moves from its central or intermediate rest position outward along one or the other of the ramp assemblies 19 and 20 which form the opposite branches of a predetermined path provided for the ball. Depending upon the direction travelled by the ball 21, it actuates either right or left switch SR, SL mounted respectively on ramp assemblies 19 and 20 which, depending upon the distance the ball 21 travels from its normal rest position, closes an electrical circuit to a warning device and then the control circuit for the trailer brakes, all as will be more fully described hereinafter.

Figure 6:
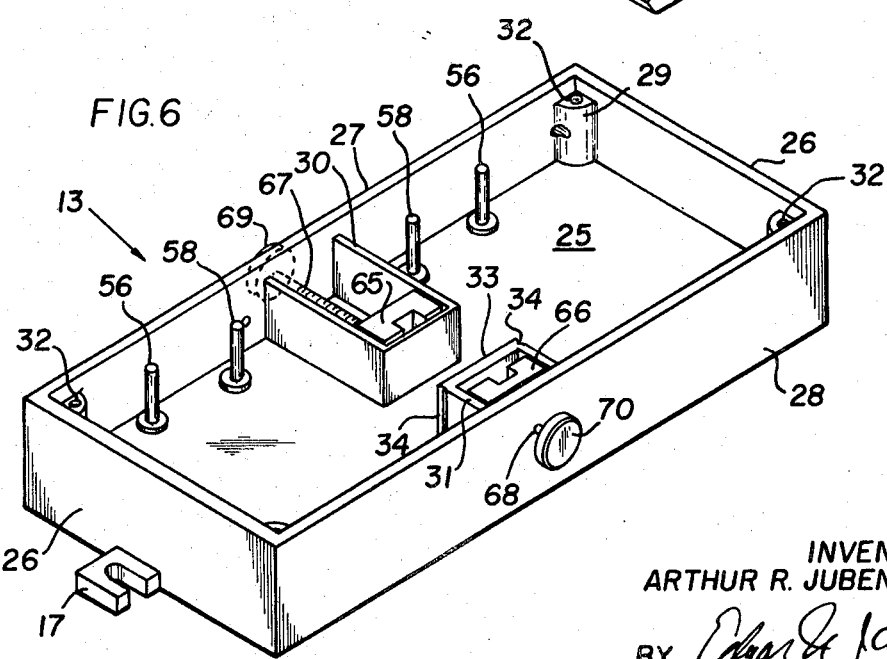
FIG. 6 is an isometric view of the casing with its cover and all internal parts removed except the biasing magnets.

Referring now to the drawing in greater detail and, in particular, to FIGS. 2, 4 and 6, casing 13 comprises a back 25, side walls 26, top wall 27 and a bottom wall 28. The casing 13 is conveniently cast in one piece from a shock-resistant plastic including corner bosses 29 and two sets of parallel magnet guides, upper magnet guides 30 and lower magnet guides 31. Bosses 29 have holes 32 formed therein to receive the screws 16 (FIG. 2) by which the cover 15 is secured to the casing 13. The lower magnet guides 31 are bridged at their upper ends by a platform 33, the sides of which are beveled so as to form, with the complementarily beveled upper ends of the lower magnet guides 31, a pair of oppositely facing seats 34 which are "V" shaped in cross section and which serve to receive and pivotally engage the inner opposed ends of the ramp assemblies 19 and 20. To facilitate centering of the ball 21 in its normal rest position, the platform 33 is preferably concave and, if desired, can have a small depression (not shown) formed in the center of its upper surface.

The two ramp assemblies 19 and 20 are identically constructed, and therefore only ramp assembly 19 will now be described in detail here. It is to be understood, however, that ramp assembly 20 is made up of like parts which are indicated by the same reference characters in the drawing that serve to designate the corresponding parts of assembly 19. Ramp assembly 19 comprises an elongated ramp member 35 having an elongated slot 36 formed in its inner, left-end portion, the extremity of which is beveled to be received in one of the seats 34, the right-hand one, formed by the platform 33 and the lower magnet guides 31. At its outer free end, ramp member 35 has a transverse hole 40 formed therein to receive a screw 37 carrying a washer 37a. The width of ramp member 35 corresponds substantially to the depth of casing 13, and the screw 37 passes through a slot 38 formed in the cover 15 of the casing. As shown most clearly in FIG. 2, a second slot 39 is formed in cover 15 to receive the screw 37 engaged in the outer end of the ramp member 35 of the ramp assembly 20. The screws 37 and washers 37a by their engagement with the outer surface of the cover 15 provide a ready adjustment of the inclination of the ramp assemblies 19 and 20. It is to be noted that the curvature of the slots 38 and 39 corresponds to the arc swept out by the adjusting screws about the pivots or seats 34.

Figure 7:
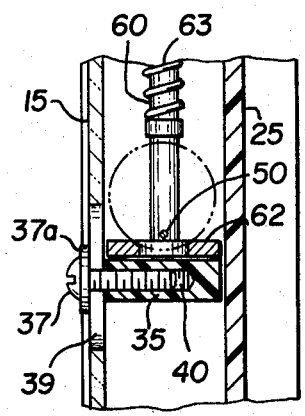
FIG. 7 is an isometric view of one of the ramp members.

As is most clearly shown in FIGS. 2 and 7, each of the ramp members 35 is preferably provided with upwardly projecting extensions 45, the upper surfaces of which form a smooth continuation of the upwardly presented surface of the inner portion of the ramp member 35 over which the ball 21 is free to roll. The extensions serve to ensure the return of the ball 21 toward its center position when the inclination of the ramp member 35 loses its effectiveness because of a reversely or negatively sloped road surface or because of excessive leaning of the trailer on a highly crowned road. The single-pole, double-throw switch SR is fixed to the undersurface of the ramp member 35 with the free end of its resilient pole 47 projecting below the slot 36 adjacent the inner end of the ramp member 35 and between upper switch contact 48 and lower contact 49.

The switch actuating means preferably comprises an elongated control bar or lever 50 formed of any suitable, rigid material such as brass, which is connected at one end thereof to the free end of the pole 47 as by being soldered or welded thereto, and extends through slot 36 and along the upwardly presented surface of the ramp member 35. The lever 50 normally extends spaced above the ramp member 35 and above and between its extensions 45 to a point beyond the latter so that when the ball 21 is accelerated sufficiently to roll along the lever 50 and up over the extensions 45, it comes to rest on the free-end portion of the lever 50 where it is trapped until released.

Intermediate its pivoted end and the start of the extensions 45, the ramp member 35 can be provided with a tab or projection 51 on its upper surface which functions as a fulcrum to facilitate operation of the lever 50.

When, as a result of a sudden change in the motion of the trailer 10, the ball 21 is caused to leave platform 33 and roll along the right ramp member 35, the ball is first in engagement with the left-end portion of the lever 50 which is fixed to the free end of the resilient pole 47 of the switch SR. The weight of the ball depresses the lever 50 which in turn shifts switchpole 47 to close the lower contacts 49 thereby closing a circuit to a warning device as will be more fully described hereinbelow. Continued movement of the ball to the right of the projection 51 serves to counterbalance the lever 50 and cause it to rotate clockwise as viewed in FIG. 2 and raise the free end of switch pole 37 to open lower contact 49 and to close upper contact 48 thereby closing a circuit for actuating the trailer brakes as will be more fully described hereinbelow. As the ball 21 continues up to the spaced extensions 45, it maintains engagement with the lever 50, holding the latter down between the extensions and thereby holding the upper contacts 48 of switch SR closed. If the forces acting on the ball 21 are great enough, then the ball will traverse the full length of extensions 45 and actuate gate means 52 so that it becomes trapped on the free end of lever 50 to keep the upper contacts 48 closed until the ball is released.

Gate means 52 are provided to control the access of the ball 21 to its trapped position and reset means 53 for returning the ball to its normal operating relationship on the path formed by the ramp assemblies. Gate means 52 comprises a gate member 54 pivotally mounted intermediate its ends at 55 on a pin 56 projecting from the rear wall 14 of the casing 13. A flat spring 57 adjacent one end 57a thereof is pivotally mounted on a pin 58 which also is fixed to the rear wall 14. The other end of spring 57 bears against one end of gate member 54, the other end of which normally obstructs the path of ball 21 and prevents it from leaving extensions 45 until it attains sufficient momentum to overcome the bias of spring 57 and raise the gate member 54. Whereupon the ball is trapped on the end portion of lever 50 by the action of the gate member 54 under the influence of spring 57 until the reset means 53 are actuated to free the ball and return it to the other side of the extensions 45 so that it is free once again to roll down the ramp member 35. A screw 41 carrying a knob 42 is threaded through the top wall 27 of the casing 13. The inner end of screw 41 bears against the end portion 57a of spring 57 and, when turned in or out, serves to vary the tension applied by the spring to the gate member 54 so that the ball requires a correspondingly greater or lesser momentum to overcome the spring 57 and actuate the gate member 54.

Reset means 53 comprises a shaft 60 slidably mounted through a hole formed in the upper wall 27 of the casing. Shaft 60 has a knob 61 fixed to its upper end which projects above the casing. Within the casing, a bifurcated shoe 62 is fixed to the lower end of the shaft 60 and projects below and to either side of the free end of lever 50 between ramp extensions 45. The upwardly presented surface of the shoe 62 is inclined toward the adjacent ramp member 45. A coil spring 63 is positioned on the shaft 60 which biases the shaft 60 and shoe 62 in their downward position. When the ball 21 is trapped on the end of the lever 50, it is freed by raising knob 61, shaft 60 and shoe 62, thereby compressing spring 63. Upward movement of the shoe lifts the ball from lever 50 against the spring biased gate member 54 which forces the ball 21 over the top of the extensions 45 onto the inclined surfaces thereof. Once the ball is thus freed, spring 57 restores the gate member 54 to its normal position, and, upon release of knob 61, spring 63 urges the reset means back to its normal position. It is to be noted that the slot provided by the bifurcated shoe 62 is wide enough to accommodate the lever 50 so that the latter is not disturbed by operation of the reset means to lift the ball.

In some instances, as in the case of relatively short trailers ranging from about 5 to 15 feet in length, the aforementioned recess (not shown) that can be formed in platform 33 may be used to provide sufficient bias for maintaining ball 21 in its central position so that the control unit is not unduly sensitive. Preferably, magnetic biasing means are used which can include permanent magnets or electromagnetic means or combinations thereof. In the preferred embodiment now being described, two permanent magnets, upper magnet 65 and lower magnet 66, are respectively slidably mounted in the upper and lower magnet guides 30 and 31. The magnets 65 and 66 are bored, and internally tapped sleeves are fixed therein which are in threaded engagement with screws 67 and 68 respectively. Screw 67 is rotatably mounted in a hole provided in the casing top wall 27 and has a knob 69 fixed to its projecting upper end, rotation of which in one direction or the other serves to raise or lower the upper magnet 65. Similarly, screw 68 is rotatably mounted in a hole provided in the casing bottom wall 28 and has a knob 70 fixed to its projecting lower end, rotation of which serves to raise or lower the lower magnet 66.

A high degree of flexibility is provided by utilizing as the acceleration sensing body 21, a steel ball about 9/16 inch in diameter and weighing about 0.4 ounce. The strength of the magnets is such that when placed in their position closest to platform 33, the magnetic field is sufficient to hold the ball stationary when the casing, as viewed in FIG. 2, is inclined at about 45° to the horizontal. When either or both of the magnets 65, 66 are shifted away from platform 33, the biasing force on the ball 21 is reduced when the latter is in its central, rest position. This permits a wide enough range of adjustment so that the unit as thus far described is well suited for use in controlling the brakes of trailers of medium size and weight. That is to say, trailers ranging in length from about 15 feet to about 30 feet or more and ranging in weight from about 2,000 pounds to about 6,000 pounds or more.

Conveniently, an on/off switch 71, fuse 72 and terminals 73, 74 and 75 are provided above casing top wall 27 whereby to facilitate putting the unit into and out of service. Referring now to FIG. 8, terminal 75 is connected by a lead 80 to fuse 72 which in turn is connected through on/off switch 71 to one side of the electrical power supply of the trailer 10, shown as a battery 76. Terminal 74 is connected by lead 81, preferably through a variable resistor 77, to the actuating coils of the trailer brakes 78 preferably in parallel with the conventional manually operated control (not shown) usually provided for use by the operator of car 11. Variable resistor 77 provides a convenient adjustment of the braking force applied to the trailer wheels to accommodate such variables as road conditions and loading of the trailer as well as others. Terminal 73 is connected by lead 82 to a signal lamp 79 which serves as a warning device. If desired, an electrically actuated, audible warning device can be used in place of lamp 79 or in addition thereto, and in the latter case, the audible warning device would preferably be connected in parallel with the lamp 79.

As most clearly shown in FIG. 8, switches SR and SL are connected in parallel, and the operating circuit is completed as follows. Both of the switch poles 47 are connected together and to terminal 75 by lead 83, both of the upper contacts 48 are connected together and to terminal 74 by lead 84, and both of the lower contacts 49 are connected together and to terminal 73 by lead 85.

The warning device when in the form of lamp 79 can be mounted on the front of trailer 10 as shown in FIG. 1 in a position where it can readily be seen by the operator of car 10 through his rear view mirror. When an audible warning device is used either alone or in combination with the lamp, it can also be mounted in the same general area. However, it is preferred to mount the warning lamp 79 in front of the operator in car 11 and, in addition, provide a second on/off switch in series between switch 71 and battery 76 so that the system can readily be turned off by the operator if unusual circumstances should require it without the need for the operator to leave his driving position.

Preliminary or initial adjustment of the control system to place it into service is readily carried out. With the unit as thus far described and illustrated mounted in place, lead 81 is disconnected from terminal 74 so as to break the connection to the trailer brakes, but leaving the warning lamp 79 connected. To adjust for proper and adequate operation of the warning lamp, upper and lower magnets 65 and 66 are shifted to their open or mutually most remote positions. Then by actual road test, the magnets are shifted toward platform 33 until the desired degree of sensitivity is achieved for the particular trailer. Usually, a satisfactory adjustment is one which results in the ball 21 actuating the control lever 50 of either switch SL or SR in response to a minimum disturbance of the trailer great enough to cause it to oscillate about three inches to either side while travelling at a speed of about 25 to 30 miles per hour which in practice has been found to provide effective warning lamp operation over the normal speed range extending up to about 60 m.p.h. for a trailer about 23 feet long and weighing about 5,000 pounds. When the unit has thus been adjusted, lead 81 is reconnected and then the trailer is towed to test the duration of the brake pulse. This is carried out with gate means 52 biased sufficiently to prevent ball 21 from being trapped so that the amount of time required for ball 21 to return to a central position to deactivate the trailer brakes can be checked. If operation is too sluggish and the brakes are kept on longer than required, then the inclination of the ramp members 35 is increased. Similarly, if the ball is returned too rapidly so that the brakes are not kept on long enough, then the ramp members are lowered until the correct inclination for proper response is obtained. These adjustments are readily carried out in practice by operating the towing and towed vehicles both in the normal way and to cause the trailer to oscillate so that the effect of the various adjustments can be observed. Variable resistor 77 is adjusted to provide the proper braking force when the brakes are actuated by the closing of contacts 48 to compensate for variations in the weight of the trailer.

The gate means 52 for trapping ball 21 and reset means 53 are a desirable feature of this invention, but, as was pointed out hereinabove, spring 57 can be tensioned to such an extent that, in operation, ball 21 cannot shift gate member 54 to its open position, and the ball cannot be trapped. This is desirable when traversing rough roads or when travelling cross-country. In some instances, such as when continuous brake operation is not desired, both the gate means and the reset means can be omitted entirely. In that event, the ball is always free to rebound from side walls 26 or a suitable stop that can be provided for that purpose, and be returned to or toward its central position on platform 33. The ball 21 is there sooner or later brought to rest by the magnetic bias from magnets 65 and 66, depending upon the ball's momentum and the forces acting on it.

As shown in FIG. 2, magnets 65 and 66 are preferably U-shaped and are positioned with their like poles in alignment so that the direction of the flux from each through the ferromagnetic ball 21 will be the same and thus be additive. Bar-type magnets can also be used if desired; however, unless suitable pole pieces or a low reluctance flux return path is provided, bar magnets would be substantially less efficient than U-shaped magnets.

Once the control unit has been adjusted for normal service, the towing vehicle with the towed trailer connected to it is operated in the usual way. So long as lateral acceleration of the trailer is less than that required to cause displacement of the ball 21 relative to its rest position on platform 33, the control unit remains inactive. When the ball 21 does leave its rest position, the warning light 79 is energized. If the operator is satisfied that the sensitivity adjustment is correct, then flashing of the warning light 79 may indicate that the speed is too great for the road being negotiated and prevailing wind conditions. Reduction of the speed to no more than that at which the warning light remains off avoids the possibility of a more dangerous condition such as would occur upon an increase in the curvature of the roadway or a rise in the wind velocity. In the absence of excessive speed, flashing of the warning light may be the result of the trailer being unevenly loaded with too much of the loads toward its rear. A tire going soft can also result in flashing of the warning light as can also an unbalanced or otherwise defective hitch between the trailer and the towing vehicle. Thus, the control system greatly facilitates early detection of unsafe conditions.

When the force generated by lateral acceleration of the trailer is not only great enough to overcome the restraining effect of the bias magnets 65 and 66 to permit energization of the warning lamp, but also enough to result in sufficient displacement of the ball 21 along one of the levers 50 to counterbalance it and raise the free end of the switch pole 47 connected thereto, then the circuit to the lamp is opened, and continued upward movement of the pole 47 serves to close the brake energizing circuit and the trailer brakes are energized for as long as the circuit remains closed. If desired, a further parallel circuit (not shown) controlled by pole 47 and upper contacts 48 can be provided so that the warning lamp is also energized when the brakes are actuated. The operation of the system to energize the trailer brakes is much faster than that of even the most highly skilled operators and, by forcing the rear of the trailer back into line behind the towing vehicle, ensures rapid damping of any tendency to oscillate. A further effect of the sudden application of the trailer brakes and consequent rapid lateral deceleration is to cause a relatively rapid displacement of the ball 21 from the side it was on toward the opposite side usually with sufficient force to keep the ball from being retained on platform 33 so that the switch on the opposite ramp assembly is actuated to energize the trailer brakes once again. This action may be repeated several times until substantial lateral motion of the trailer is eliminated.

In addition to being fast acting, the control system provides a long useful, trouble-free life in operation. In this connection, it is also to be noted that the operation of each of the switch poles 47 by means of the lever 50 connected thereto, as was described hereinabove, provides a positive wiping action between its contacts and the upper and lower contacts 48 and 49 that ensures proper switch action throughout a long useful life.

In accordance with a further feature of this invention, electromagnetic means can be used instead of the permanent magnets 65 and 66. Referring now to FIG. 9, control unit 100 is identical to that described in connection with FIGS. 2-8 except that an electromagnet 101, preferably U-shaped to avoid an unnecessarily long return path through air, is mounted above platform 33 and is connected to a potentiometer 102 which in turn is connected across a battery which can be the trailer battery 76. Potentiometer 102 is preferably positioned adjacent to the operator of the towing vehicle and adjustment of its control knob serves to vary the bias applied to hold ball 21 at rest on platform 33. Such an arrangement is especially desirable when, as in the case of tractor-trailer combinations utilized in hauling and delivering freight, there is a large difference between the laded and unladed weight of the trailer. This feature also facilitates in-transit sensitivity adjustments by the operator as may be required by a change in road conditions or in the weight being carried in the trailer.

When it is desired to provide for remote actuation of reset means 53, a pair of solenoids 105 and 106 are provided about the shafts 60 as shown in FIG. 10 which, when energized, urge the shafts upward as indicated by arrows 107. The solenoids 105 and 106 are connected in parallel, one side thereof being connected through the common ground to the grounded side of trailer battery 86 and the other side thereof being connected to a manual switch 108 which is normally open and which is in turn connected to the battery 76. Switch 108 is positioned adjacent to the operator of the towing vehicle. When it is desired to free the trapped ball, switch 108 is momentarily closed and both of the solenoids 105 and 106 are energized so that the ball 21 is released from its trapped position, whether it happens to be trapped on the right or the left ramp assembly.

Figure 12:
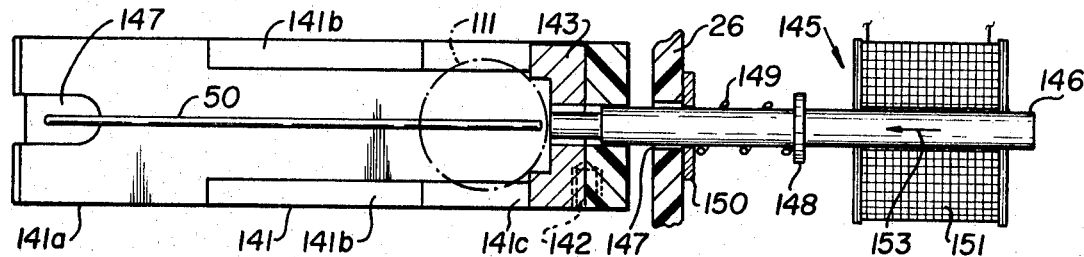
FIG. 12 is a sectional view along the line 12—12 of FIG. 11.

Referring now to FIGS. 11 and 12, a further embodiment of this invention comprises two balls 111 and 112 utilized in a control unit 110. A pair of U-shaped electromagnets 113 and 114 are mounted between platform 115 and an opposed upper support member 116, with the poles of electromagnet 113 being presented to the right toward ball 111 and those of electromagnet 114 being presented to the left toward ball 112. Platform 115 and support member 116 are connected to the rear wall 117 of casing 118 and are supported by transverse members 119. The right and left extremities of the platform 115 can each be beveled to provide a U-shaped seat 120 for the inner ends of the ramp members 141 of the right and left ramp assemblies 139 and 140. The ramp assemblies 139 and 140 are of identical construction. Thus, only the assembly 139 will be described here, and the corresponding parts of both are designated on the drawing by the same reference characters.

Each of the ramp members 141 adjacent its inner end is pivotally supported on a pin 123, the opposite ends of which are supported by the cover and back wall of the casting. The control unit 110 can include the gate means 52 and reset means 53 as previously described in connection with FIG. 2. However, it is preferred to use the gate means and reset means yet to be described in connection with FIGS. 11 and 12 as part of the control unit for coaction with the two balls 111 and 112.

Ramp members 141 are each preferably formed of a suitable, shock-resistant plastic having, in addition to slotted, inner-end portion 141a, an intermediate portion 141b and an outer-end portion 141c. As shown, intermediate portion 141b forms a pair of spaced inclines joining the inner portion 141a and the outer portion 141c, the latter forming a rest for the ball 111 or 112, associated therewith, above the free end of lever 50. The outer portion 141c has a tapped hole 142 to receive screw 37 which clamps the ramp assembly to the casing cover 124 at the desired angle as was described in connection with ramp assembly 19 (FIG. 5), cover 124 having slots 125 and 126 formed therein for that purpose. Magnetic means in the form of a U-shaped permanent magnet is positioned on and fixed to the ramp portion 141c with its poles juxtaposed to the rest formed by the former for the ball 111 or 112. There is sufficient flux from the magnet 143 to hold the ball on its rest. A guide member 144, supported on the ramp member 141, projects inwardly from the magnet 143 to prevent the ball from riding upward around the magnet when it is being freed by reset means 145 now to be described.

As shown in FIGS. 11 and 12, magnet 143 has a longitudinal bore formed therethrough, through which a plunger 146 extends. Plunger 146 extends through a slot 147 formed in the side wall of the casing 118 and carries a fixed collar 148 which serves as a retainer for a coil spring 149, the other end of which bears against a washer 150 through which the plunger 146 is free to move and which is free to slide along the lips of slot 147 when the inclination of the ramp assembly 140 is adjusted. Plunger 146 can be manually actuated to release ball 111 (ball 112 in the case of the ramp assembly 140) when pushed to compress spring 149, and, when released, it is returned by the spring. It can also be actuated by means of a solenoid 151 surrounding the plunger 146 which is made of suitable ferromagnetic material. It is to be understood that solenoid 151 is movably mounted in any convenient way so that it can move with plunger 146 when the inclination of the ramp assembly is adjusted. The windings of the solenoids 151 of the two ramp assemblies are connected in parallel across the trailer battery 76 through a normally open switch 152 mounted in the towing vehicle adjacent the operator. Both solenoids 151 are energized when switch 152 is closed.

The windings of the electromagnets 113 and 114 are connected in parallel across a potentiometer 121 which is in turn connected across the trailer battery 76. The potentiometer 121 is mounted in the towing vehicle adjacent to the operator. If desired, a single winding can be used to energize the four pole pieces of the electromagnets 113 and 114 as is well known to those skilled in the art.

Switches SR and SL which form part of the ramp assemblies are connected as was described in connection with FIG. 8 and, to avoid unnecessary repetition, the associated circuitry has been omitted from FIG. 11. The operation of control unit 110 will be apparent from the operation of the control unit described in connection with FIG. 2. It is to be noted that with the two balls 111 and 112, faster response can be provided because instead of the one ball which must traverse the platform 33 between the ramp assemblies, the second ball of the present embodiment is already in position to traverse its ramp member and associated switch lever 50. Thus, assuming ball 112 to be in its center position adjacent its electromagnet 114 and ball 111 to be approaching but not trapped by the gate means formed by the magnet 143 at the right end of the right ramp assembly 139, as the rear of the trailer is subjected to a substantial force which results in the rear of the trailer to swing to the left both balls will undergo an apparent acceleration to the left as viewed by an observer riding in the trailer and facing to the rear and the unit on the rear wall of the trailer. Though ball 111 is still descending its ramp member, ball 112 is immediately propelled up its ramp member 141 which forms part of ramp assembly 140 whereby the time interval between brake pulses is reduced. This is particularly desirable in the case of large trailers carrying a heavy cargo at high speed.

When either ball is held trapped by the magnet 143 of its ramp assembly, it is only necessary for the vehicle operator to momentarily close the switch 152 to eject the ball from its rest. Energization of the solenoid winding causes the plungers 146 to move inward, to the left as indicated by arrow 153 in the case of the right assembly and in the opposite direction in the case of the left assembly. While the magnetic gating means 143 has been described in connection with the two-ball arrangement of FIG. 11, it is to be understood that the same can be used in connection with other embodiments, particularly that described in connection with FIG. 2.

Figure 13:
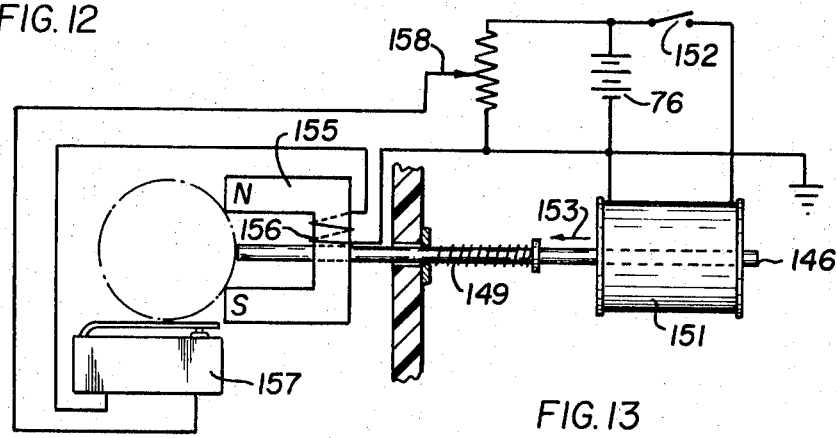
FIG. 13 is a further modification illustrating the use of electromagnetic gate means.

In accordance with a further feature of the present invention, electromagnetic means are utilized to trap the acceleration sensing ball as will now be described in connection with FIG. 13. Electromagnetic means 155 comprises a winding 156 and pole pieces as indicated by the letters "N" and "S" and has a bore formed therethrough for the ready passage of plunger 146 which, together with spring 149 and solenoid 151 are mounted and connected as was described in connection with FIGS. 11 and 12. Electromagnet winding 156 is connected through a switch 157 across potentiometer 158 which in turn is connected across battery 76. Potentiometer 158 is located adjacent the operator in the hauling vehicle. Switch 157 is normally open and is positioned on ramp member 141 adjacent its outer portions 141c so as to be closed by ball 111 when the latter is held on its rest by the electromagnet; whereby the electromagnet is energized only when the ball is in its trapped position, thus avoiding unnecessary current drain from battery 76. The operation of this embodiment will be readily apparent from those already described except that the trapping force can be readily adjusted by the driver from his operating position and, when desired, can be reduced to zero at will so that there is no trapping of the ball.

While the present invention has been described in detail in connection with trailers having electrically actuated brakes, it is equally applicable to trailers having other types of brakes. For example, in the case of a trailer having pneumatically actuated brakes, the upper contacts of the switches SR and SL are connected to control the energization of solenoid valves which in turn control the pneumatic brakes as is well known.

Figure 14:
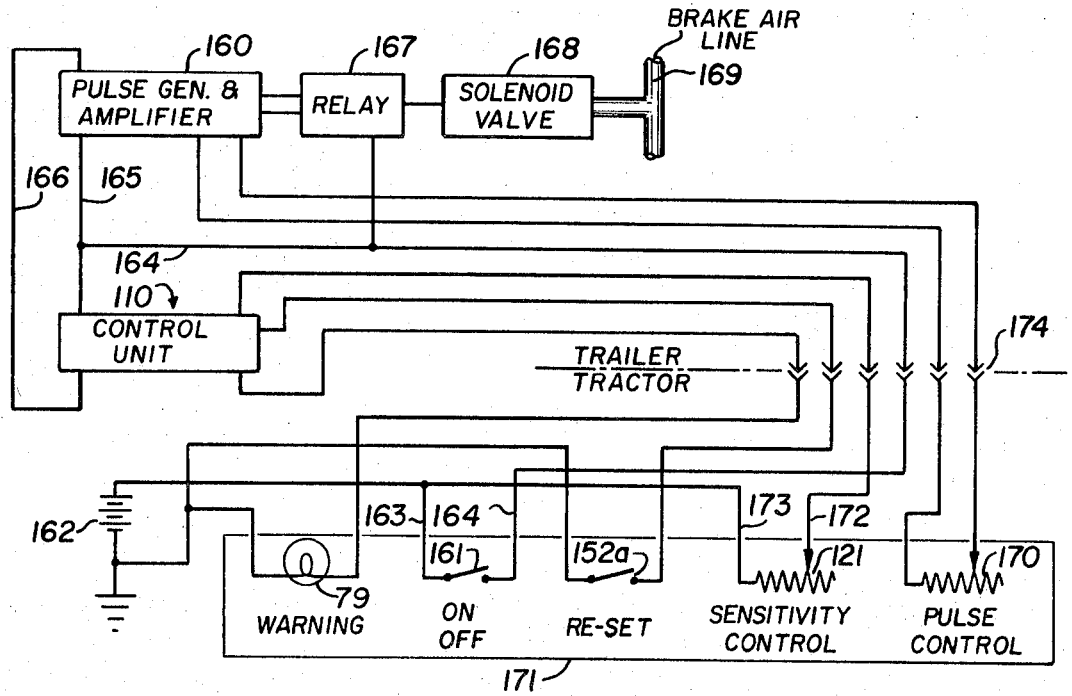
FIG. 14 is a schematic view of a further modification of the control system.

The control system as thus far described herein provides some degree of pulsating operation of the trailer brakes. In the case of heavy commercial trailers, it is desirable to have available a more positive pulsed operation of the trailer brakes which can be adjusted at will by the operator as will now be described in connection with FIG. 14. In the schematic diagram of FIG. 14, control unit 110 (constructed as previously described in connection with FIG. 11) is indicated as mounted in a commercial, heavy load-carrying trailer towed by a tractor to which it is connected by a conventional fifth wheel arrangement. Since the trailer, the tractor and the manner of their interconnection form no part of this invention, it is not considered necessary to describe the same further here. It is to be understood that the control unit 110 is mounted on the trailer, preferably to the rear of its wheels and with the path formed by the ramp assemblies 139 and 140 extending transverse to the front-to-back center line of the trailer. A pulse generator and amplifier 160 and the control unit 110 are connected in parallel across battery 162 through on/off switch 161 and lead 163, lead 164 (connected to control unit terminal 75 which is connected internally to the upper contacts of the two ramp assembly switches) and lead 165, the latter completing the power connection to the pulse generator and amplifier 160 except for the common ground return which is not shown.

The brake terminal 74 of the control unit 110 is connected by lead 166 to the signal input terminal of the pulse generator and amplifier 160. The output of the amplifier is connected to the winding of relay 167 which, when energized, shifts its contacts to complete the circuit between battery 162 and the winding of solenoid valve 168 controlling the air line 169 to the trailer brakes thereby energizing the brakes. The brakes are de-energized when at the end of each pulse the solenoid valve 168 is shifted.

The pulse generator and amplifier 160 may be of known construction to provide pulses of desired duration and frequency in response to the closing of the upper contacts of either of the ramp switches in the control unit 110. Since the construction of the pulse generator and amplifier 160 forms no part of the present invention, a detailed description thereof is not necessary here because its construction will be obvious to those skilled in the art. However, it is to be noted that a capacitor-resistor (CR) network, only the variable resistor 170 of which is shown in the drawing, is used in the well-known way to vary the duration of the pulses by changing the time constant of the CR network. The time constants of the individual trailer braking system, road conditions and the speed should all be taken into account when adjusting pulse control resistor 170 to provide the desired pulsating snubbing action which best inhibits unwanted oscillations and fishtailing. The pulse rate may vary from as low as about 4 per minute to as many as 10 or 20 or more per minute.

Variable resistor 121 functions as a sensitivity control by permitting adjustment of the flux from the electromagnets 113 and 114 with which its movable selector is connected by lead 172 while the end of the included portion of resistor 121 is connected through leads 173 and 163 to battery 162. Reset switch 152a corresponds to reset switch 152 and differs only in that it is connected on the grounded side of battery 162.

A control panel 171 is mounted in a convenient position adjacent the tractor operator on which are mounted the warning light 79, on/off switch 161, reset switch 152a, sensitivity control 121, and the pulse control 170. Except for the tractor battery 162 from which the electrical power is drawn,, the remainder of the control system is conveniently mounted on the trailer and is interconnected by a suitable socket as indicated at 174.

When, in the operation of heavy trailers at relatively high speed, it is desired to reduce still further the time required for the generation of the brake actuation signal independent of the sensitivity of the system, the terminals 73 and 74 connected respectively to the warning light 79 and the trailer brakes 78 (FIG. 8) can be connected by closing a switch (not shown) so that the trailer brakes are energized at the same time the warning light is energized.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A trailer antifishtail control system for a vehicular trailer having brakes and actuating means therefor, comprising means forming a predetermined path having two branches with a branch extending on opposite sides of an intermediate portion of said path forming a rest position, means for adjusting the inclination of said branches relative to the horizontal and to said rest position by raising mutually remote portions thereof above the horizontal, an acceleration sensing body normally stationary on said rest position, said body and said path forming means being substantially freely movable relative to each other apart from the influence of gravity in response to an acceleration of the latter having a component extending in a direction parallel to said path, means for applying a predetermined force to said body while it is on said rest position in a direction to retain said body thereon, and means responsive to the arrival of said body at a predetermined point along each of said branches for actuating said trailer brakes.

2. A trailer anti-fishtail control system for a vehicular trailer having brakes and actuating means therefor, comprising means forming a predetermined path having two branches with a branch extending on opposite sides of an intermediate portion of said path forming a rest position, at least one acceleration sensing body normally stationary on said rest position, said body and said path forming means being substantially freely movable relative to each other apart from the influence of gravity in response to an acceleration of the latter having a component extending in a direction parallel to said path, means for applying a predetermined force to said body while it is on said rest position in a direction to retain said body thereon, and means for actuating said trailer brakes including switch means and a pair of elongated levers one extending along each of said path branches responsive to the arrival of said body at a predetermined point along each of said branches for actuating said switch means.

3. A trailer antifishtail control system as set forth in claim 2 wherein a warning device is connected to said switch means for energization thereby by one of said levers in response to the arrival of said body at a point along each of said path branches intermediate said rest position and one of said predetermined points.

4. A trailer antifishtail control system as set forth in claim 3 wherein each of said branches of said path forming means includes a portion thereof which is inclined to the remainder for retarding motion of said body relative to said branches in the direction away from said rest position, said means for applying a force to said body while it is in said rest position includes magnetic means supported adjacent to said rest position, said body being formed of ferromagnetic material, means for varying the force applied by said magnetic means to said body when the latter is in said rest position, trapping means along each of said path branches spaced from said predetermined point on the side thereof away from said rest position for releasably retaining said body, and reset means for releasing said body from said trapping means.

5. A trailer antifishtail control system as set forth in claim 2 further comprising trapping means along each of said path branches spaced from said predetermined point on the side thereof away from said rest position for releasably retaining said body, and reset means for releasing said body.

6. A trailer antifishtail control system as set forth in claim 5 wherein said trapping means is formed by portions of said path forming means at the mutually remote end of said branches extending substantially below the portions of said branches immediately adjacent thereto on the side thereof toward said predetermined points.

7. A trailer antifishtail control system as set forth in claim 6 wherein said reset means comprises a pair of plungers one mounted adjacent to each of said trapping means, resilient means normally urging each of said plungers toward its associated trapping means, and a pair of shoes one connected to each of said plungers for raising said body high enough to free the same from said trapping means.

8. A trailer antifishtail control system as set forth in claim 5 wherein said trapping means includes magnetic means adjacent the mtually remote ends of said path branches.

9. A trailer antifishtail control system as set forth in claim 8 wherein said magnetic means comprises a permanent magnet positioned to trap said body when the latter approaches the same.

10. A trailer antifishtail control system as set forth in claim 9 wherein each of said permanent magnets has a bore formed therethrough opening toward said body when the latter is trapped by the magnet, a pair of movably mounted plungers one extending in each of said bores and each movable between a retracted position and a position in which it projects through said bore to free said body from the associated magnet, and resilient means urging each of said plungers toward its said retracted position.

11. A trailer antifishtail control system as set forth in claim 2 wherein said means for applying a force to said body while it is in said rest position includes magnetic means supported adjacent to said rest position, said body beng formed of magnetic material.

12. A trailer antifishtail control system as set forh in claim 11 which includes means for varying the force exerted by said magnetic means on said body when the latter is on said rest position.

13. A trailer antifishtail control system as set forth in claim 11 in which said magnetic means includes a permanent magnet, and means movably supporting said magnet substantially vertically alined with said rest position, and means for substantially vertically displacing said magnet relative to said rest position whereby to vary the magnetic flux affecting said body when it is on said rest position.

14. A trailer antifishtail control system as set forth in claim 11 in which said magnetic means includes electromagnetic means adjacent to said rest position for providing magnetic flux, and means remote from said rest position coupled with said electromagnetic means for varying the magnetic flux.

15. A trailer antifishtail control system as set forth in claim 2 wherein the means responsive to said body for actuating said trailer brakes comprises means for periodically energizing and de-energizing said brakes and includes a pulse generator.

16. In a control system for use in controlling a vehicular trailer having brakes, path means forming a predetermined path and including a pair of ramp assemblies mounted on opposite sides of and spaced by an intermediate portion of said path with the latter forming a rest position, at least one acceleration sensing ferromagnetic ball freely movable along said path relative to said ramp assemblies in response to an acceleration of the latter having a component extending parallel to said path, magnetic means for biasing said ball while it is on said intermediate portion in a direction to oppose the forces generated by said acceleration, and means responsive to the arrival of said ball at a predetermined point along each of said ramp assemblies for actuating said trailer brakes including switch means responsive to movement of said ball relative to said path.

17. A control system as set forth in claim 16 wherein said switch means includes a pair of elongated levers one extending along each of said ramp assemblies for engagement by said ball as the latter moves along the portion of said path formed thereby to actuate said switch means.

18. A control system as set forth in claim 16 wherein said switch means includes a pair of double-throw switches one connected to each of said ramp assemblies and having an elongated resilient pole extending below and along the associated ramp assembly with its movable portion adjacent to said rest position and a pair of elongated levers one connected to the movable portion of each of said poles and extending along the associated ramp assembly away from said rest position for engagement by said ball when the latter leaves said rest position.

19. A control system as set forth in claim 18 wherein said magnetic means comprises at least one permanent magnet mounted adjacent to said intermediate portion, and means for selectively shifting said magnet toward and away from said rest position.

20. A control system as set forth in claim 19 wherein said means for selectively shifting said magnet includes a screw in threaded engagement with said magnet.

21. A control system as set forth in claim 18 wherein trapping means are provided adjacent to the mutually remote ends of said ramp assemblies for releasably retaining said ball, and means for releasing said ball from said trapping means.

22. A control system as set forth in claim 21 wherein said trapping means includes magnetic means mounted adjacent to the end of each of said ramp assemblies remote from said rest position, and said releasing means includes two spring loaded plungers one associated with each of the magnetic trapping means for ejecting said ball therefrom.

23. A control system as set forth in claim 22 wherein two solenoids are provided, one for actuating each of said plungers, and switch means for controlling the energization of said solenoids.

24. A control system as set forth in claim 18 wherein each of said ramp assemblies includes a ramp member pivotally mounted adjacent one end thereof adjacent to said rest position, said ramp member having a portion thereof remote from said rest position inclined upward in the direction away from the portion of said ramp member adjacent to said rest position, said remote portion of said ramp member on the side thereof away from said rest position forming a step along said path for trapping said ball, and means for raising said ball to restore it to the inclined formed by said remote portion of said ramp member.

25. A control system as set forth in claim 24 wherein the lever associated with each of said ramp assemblies extends along its ramp member to said step and said ball engages said lever when trapped by said step.

26. A control system as set forth in claim 25 wherein said means for raising said ball comprises two bifurcated members one positioned adjacent to each of said steps formed by said ramp assemblies for engaging said ball on opposite sides of the associated lever and without disturbing the latter.

27. A control system as set forth in claim 26 wherein said means for raising said ball comprises two spring biased shafts one connected to each of said bifurcated members, two solenoids one associated with each of said shafts, and switch means for controlling the energization of said solenoids.

28. A control system as set forth in claim 18 wherein said means for actuating said trailer brakes includes a pulse generator for repeatedly energizing and de-energizing said brakes in response to actuation of said switch means by said ball.

29. A control system as set forth in claim 18 wherein a warning device is connected to said switch means for energization thereby on engagement of any one of said levers by said ball when the latter leaves its said rest position.

30. A control system as set forth in claim 29 comprising means for adjusting said magnetic biasing means, said means for actuating said trailer brakes includes a pulse generator for repeatedly energizing and de-energizing said brakes in response to actuation of said switch means by said ball, and said pulse generator including means for varying said pulses.

31. In a vehicular trailer antifishtail control system, means forming a predetermined path having two branches with a branch extending on opposite sides of an inclined to an intermediate portion of said path forming a rest position, at least one acceleration sensing body normally stationary on said rest position, said body and said path forming means being substantially freely movable relative to each other apart from the influence of gravity in response to an acceleration of the latter having a component extending in a direction parallel to said path, means for applying a predetermined force to said body while it is on said rest position in a direction to retain said body thereon, and means including a pair of elongated levers one extending along each of said path branches for engagement by said acceleration sensing body, each of said levers being responsive to the arrival of said body at a predetermined point therealong for providing an output indicative of an acceleration of said trailer having a component along said path great enough to overcome said predetermined force.

32. A control system as set forth in claim 31 which includes a warning lamp and means connecting the same for response to said output.

33. A control system as set forth in claim 32 wherein said means for providing an output includes a pair of switches one mounted adjacent to each of said path branches, each of said switches having an elongated resilient pole extending along the associated path branch with its movable portion adjacent to said rest position and connected to the associated one of said levers, and each of said switches having a pair of contacts mounted on opposite sides of the movable portion of its pole, whereby initial engagement of one of said levers by said acceleration sensing body shifts the associated pole to close the contact mounted on one side thereof and further movement of said acceleration sensing body along said one lever to said predetermined point serves to shift said associated pole to close the contact on the opposite side thereof.

34. In a control system for use in controlling a vehicular trailer having brakes, path means forming a predetermined path and including a pair of ramp assemblies pivotally mounted on opposite sides of and spaced by an intermediate portion of said path with the latter forming a rest position, means for adjusting the inclination of each of said ramp assemblies relative to said intermediate portion and to the horizontal, an acceleration sensing ferromagnetic ball freely movable along said path relative to said ramp assemblies in response to an acceleration of the latter having a component extending parallel to said path, magnetic means for biasing said ball while it is on said intermediate portion in a direction to oppose the forces generated by said acceleration, and means responsive to the arrival of said ball at a predetermined point along each of said ramp assemblies for actuating said trailer brakes including switch means responsive to movement of said ball relative to said path.

References Cited

UNITED STATES PATENTS

| | | | |
|---|---|---|---|
| 3,398,991 | 8/1968 | Compton | 303—7 |
| 2,898,415 | 8/1959 | Clurman | 200—61.45 M |
| 3,503,652 | 3/1970 | Vanden Broek | 303—20 X |
| 3,005,643 | 10/1961 | Dugan et al. | 188—112 X |
| 3,566,987 | 3/1971 | Franzel | 180—103 |
| 3,288,240 | 11/1966 | Franzel | 180—103 UX |
| 3,256,397 | 6/1966 | Wintriss | 200—61.45 M |

FOREIGN PATENTS

| | | | |
|---|---|---|---|
| 967,110 | 10/1950 | France | 340—262 |

MILTON BUCHLER, Primary Examiner

S. G. KUNIN, Assistant Examiner

U.S. Cl. X.R.

188—3 R, 112; 200—61.45 M; 303—7, 20; 340—262